Oct. 5, 1937.  O. W. COBURN  2,094,767
PLUMB BOB
Filed Aug. 18, 1936
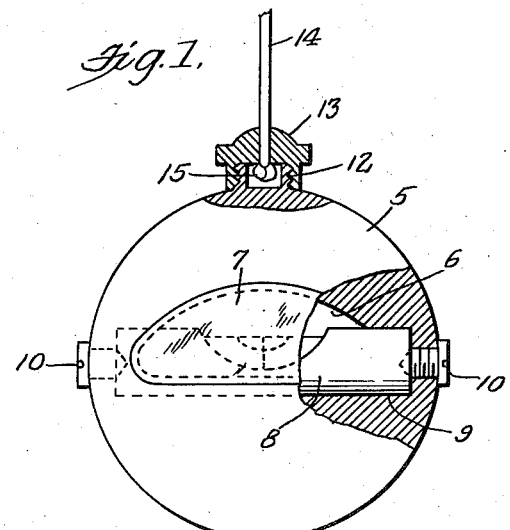
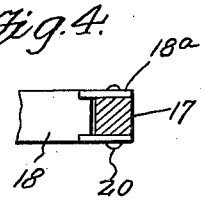
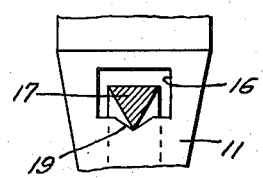
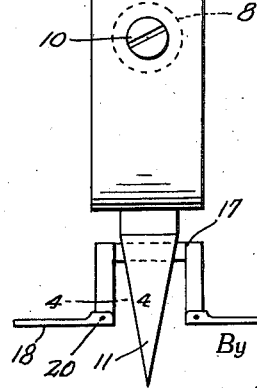
Inventor
Oren W. Coburn,
By Clarence A. O'Brien
Hyman Berman
Attorneys Patented Oct. 5, 1937

2,094,767

UNITED STATES PATENT OFFICE 2,094,767

PLUMB BOB

Oren W. Coburn, Smyrna Mills, Maine

Application August 18, 1936, Serial No. 96,673

2 Claims. (Cl. 33—210)

This invention relates to plumb bobs and an object of the invention is to provide an improved combined plumb bob and spirit level, facilitating use for either a plumb bob or level and requiring only one man for determining the plumb and the vertical alinement of the axis of the plumb with the point of securement of the plumb line.

The invention together with its objects and advantages will be best understood from a study of the following description taken in connection with the accompanying drawing wherein:—

Figure 1 is a front view of the plumb and spirit level unit with parts broken away and shown in section and Figure 2 is a side elevational view of the combination plumb bob and spirit level.

Figure 3 is a fragmentary detail sectional view on an enlarged scale illustrating certain details hereinafter more fully referred to and Figure 4 is a detail sectional view taken substantially on the line 4—4 of Figure 2.

Referring to the drawing by reference numerals it will be seen that in the preferred embodiment thereof the invention comprises a circular or disk-like body 5 formed of wood or other suitable material and having a suitable opening 6 therethrough. At opposite sides of the opening 6 are transparent sight windows 7 of glass or any other suitable transparent material.

The opening 6 constitutes a chamber for a spirit level 8, the body of the level having its respective opposite ends snugly fitting in sockets 9 provided in the body 5 at opposite ends of the opening 6, with the level securely retained in position through the medium of screws or the like 10 as clearly shown in Figure 1.

Secured to the periphery of the body 5 in any suitable manner, preferably by being integral therewith, is a substantially conical tip 11 whose apex lies in alinement with the vertical center of the body 5.

The body 5 on the periphery thereof at a point diametrically opposite to the tip 11 is provided with an integral externally threaded socket 12 with which is screw-threadedly engaged a cap 13.

The cap 13 has an opening therethrough to receive one end of the plumb line 14 which end is knotted as at 15 and has the knot 15 accommodated within the socket 12. Thus it will be seen that the plumb bob may be readily and easily secured to one end of the plumb line 14.

The tip 11 has a transverse opening 16 therethrough to loosely receive the closed end of a substantially U-shaped member 17. The end piece of the U-shaped member 17 is substantially triangular in cross-section as clearly shown in Figures 1 and 3 and one edge of said end piece of the U-shaped member engages, as shown in Figure 3, in a bearing groove 19 provided therefor in the bottom wall of the opening 16. The sides of the U-shaped member 17 are substantially rectangular in cross-section as will be noted from a study of Figure 4.

Finger accommodating pieces or extensions 18 are provided at one end with ears 18a through the medium of which said pieces or extensions 18 are pivoted as at 20, and as clearly shown in Figure 4, to the lower ends of the sides of the U-shaped member 17. It will thus be seen that the extensions 18 may fold relative to the sides of the member 17 to extend in parallelism therewith, or may be swung downwardly to their horizontal position at right angles to the sides of the member 17 as shown in Figure 2.

In using the device, the plumb bob 5 is connected with one end of the suspending cord or plumb line 14 in a manner clearly shown and hereinbefore described. Thus suspended, and with the point 11 disposed between two fingers of the operator, which fingers rest on the extended or unfolded extensions 18, the plumb is shifted about, laterally, to the right or left until the spirit bubble is centered in the observation opening, thus indicating that the line 14 is vertical or plumb.

It is thought that a clear understanding of the construction, utility and advantages of the invention will be had without a more detailed description.

Having thus described the invention what is claimed as new is:—

1. A plumb bob comprising a substantially circular body having a chamber therein provided at opposite sides of the body with sight windows, a spirit level secured within said chamber, said body being substantially circular, and a conical tip integral with and projecting radially from the peripheral edge of said body with the apex of the tip in alinement with the vertical center of said body, said tip having a transverse opening therethrough, a substantially U-shaped member having its closed end engaging within said opening, and finger accommodating extensions on the sides of said U-shaped member.

2. A plumb bob comprising a substantially circular body having a chamber therein provided at opposite sides of the body with sight windows, a spirit level secured within said chamber, said body being substantially circular, and a conical tip integral with and projecting radially from the peripheral edge of said body with the apex of the tip in alinement with the vertical center of said body, said tip having a transverse opening therethrough, a substantially U-shaped member having its closed end loosely engaging within said opening, and finger accommodating extensions being pivoted at one end to the sides of the U-shaped member, to fold relative to said sides.

OREN W. COBURN.